H. M. LAMBERT.
WHEEL RIM.
APPLICATION FILED APR. 29, 1920.
1,393,030.
Patented Oct. 11, 1921.
2 SHEETS—SHEET 1.
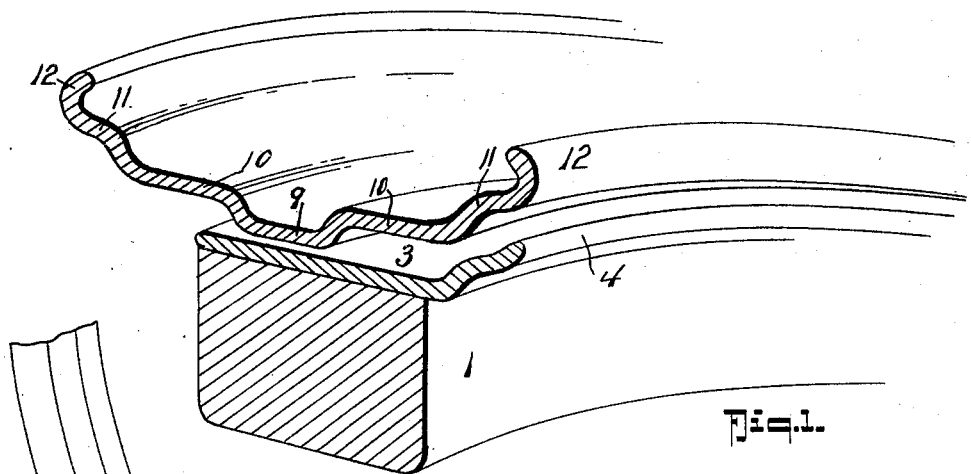
Fig. 1.
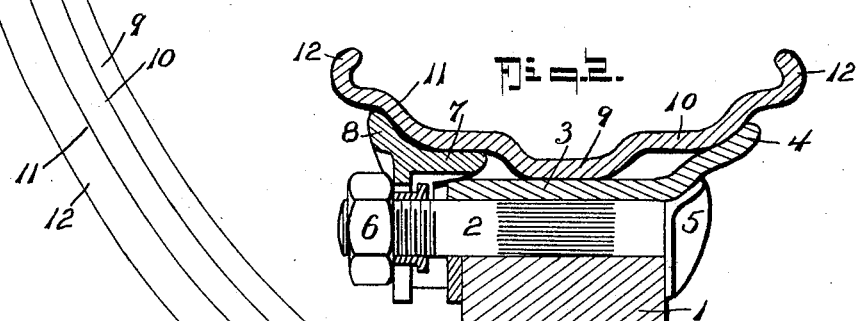
Fig. 2.
Fig. 4.
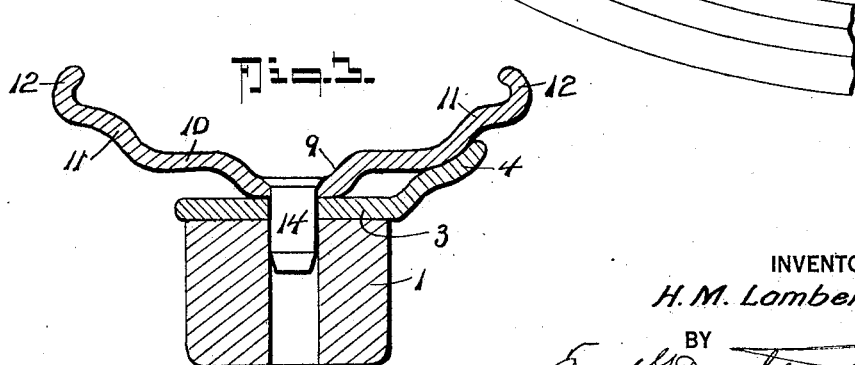
Fig. 3.
INVENTOR
H. M. Lambert.
BY
ATTORNEYS H. M. LAMBERT.
WHEEL RIM.
APPLICATION FILED APR. 29, 1920.
1,393,030.
Patented Oct. 11, 1921.
2 SHEETS—SHEET 2.
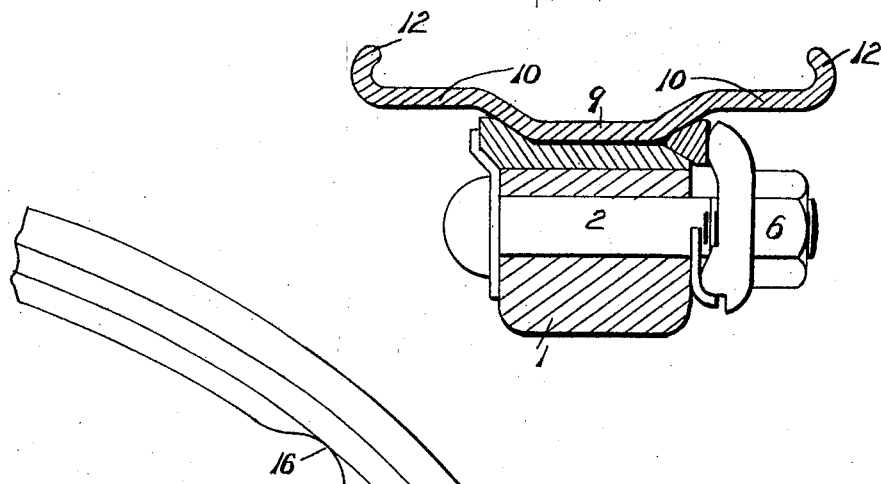
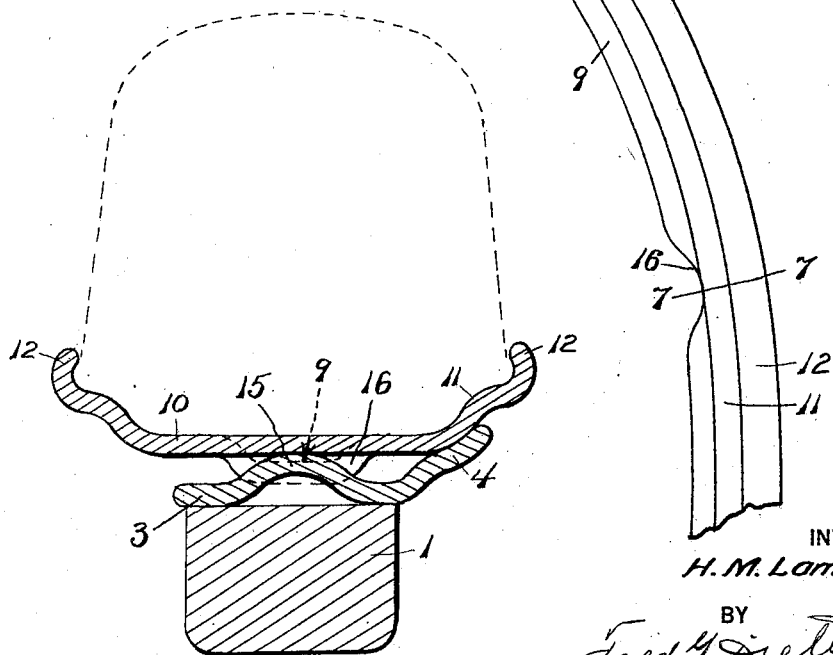
INVENTOR
H. M. Lambert.
BY
Fred G Dieterich
ATTORNEYS

UNITED STATES PATENT OFFICE.

HENRY M. LAMBERT, OF PORTLAND, OREGON.

WHEEL-RIM.

1,393,030.  Specification of Letters Patent.  Patented Oct. 11, 1921.

Application filed April 29, 1920. Serial No. 377,576.

*To all whom it may concern:*

Be it known that I, HENRY M. LAMBERT, a citizen of the United States, residing at Portland, in the county of Multnomah and State of Oregon, have invented certain new and useful Improvements in Wheel-Rims, of which the following is a specification.

My invention relates to certain new and useful improvements in construction of rims especially adapted for use in connection with cushion tires, although the same may be used in connection with pneumatic tires also, if desired. In manufacturing the well-known "Lambert Trublpruf cushion tires," it is usually the practice to build up the tire on a demountable rim so that the tire and rim can be put on wheels in lieu of the present pneumatic tire and rim without the necessity of changing the wheel and felly band structure.

In pneumatic tire rims as at present employed, the rim does not contact the felly band at the periphery of the band but only contacts the flange of the felly band on one side and the wedges of the fastening devices on the other side, leaving the central part of the rim directly over the felly band proper out of contact with the felly band. This sometimes results in a distortion of the true circle of the rim when the wedges are forced home or, in time, the rim becomes loose, even though the wedges are brought completely home, and squeaking occurs in the rim in use.

One of the objects of my invention is to provide a rim that can be placed on the usual felly band in place of the pneumatic tire rim but of such construction that the rim will engage or lie in close proximity to the felly band throughout the length thereof as well as engage the flange of the felly band and the wedges of the fastening devices. The invention also provides means whereby a driving connection between the rim and the felly band may be had aside from the engagement of the rim with the flange of the felly band and with the wedges.

In its more subordinate nature, the invention also includes those novel features of construction, combination, and arrangement of parts, all of which will be first fully described, then be specifically pointed out in the appended claims and illustrated in the accompanying drawings, in which:—

Figure 1 is a sectional perspective view of a rim and portion of a wheel embodying my invention.

Fig. 2 is a cross section of the same through one of the wedges.

Fig. 3 is a cross section through the traction lug.

Fig. 4 is a side elevation of a portion of the rim.

Fig. 5 is a cross section of a modified form of rim adapted for use on the felly band having wedge ring locks.

Fig. 6 is a side elevation of another modified form of rim to fit felly bands having buttons pressed outwardly for supports to the pneumatic rims.

Fig. 7 is a cross section on the line 7—7 of Fig. 6.

In the drawings, in which like letters and numerals indicate like parts in all of the figures, 1 represents the wheel felly on which is secured the usual felly band 3 having a flange 4 at one side on which the portion 11 of the rim is designed to rest. 2 indicates the wedge bolt, the head 5 of which engages the flange of the felly band and the bolt 2 receives the nut 6 which carries the wedge 7, the wedge 7 having a lip 8 corresponding to the flange 4 to engage the other portion 11 of the rim. The rim which constitutes my invention consists of a central depressed portion 9 that forms an annular body of lesser radius than that of the main annular portions 10—10 of the rim. The annular portions 10—10 have the side flanges 11 to rest on the flange 4 of the felly band and on the wedges and terminate in the clencher edges 12. In the manufacture of cushion tires, the base structure of the tire is built up in the rim, the depression 9 aiding in preventing lateral displacement of the tire in the rim. Furthermore, the depression 9 being in close proximity to the felly band (practically in contact with the same) when the rim is put on to the wheel, as soon as the wedges are drawn up, the rim will have vertical bearing not only on the wedges and the opposite flange of the felly band, but on the felly band 3 itself through practically the entire circumference of the rim, thus avoiding deformation of the rim in running with heavy load and eliminating the tendency of the rim to work loose and squeak.

In order to more effectually insure a driving engagement between the felly band and the rim the rim is provided with a lug 14 to fit into the valve hole of the felly band and the wheel.

In those cases where the felly band is provided with buttons 15 to form supports at intervals for the pneumatic rim, my rim is provided with transverse grooves 16 to fit over the buttons, as shown in Fig. 7.

In Fig. 5, is shown another modified form of rim in which the central portion 9 is of greater width than in the form previously described and the rim is held to the felly band by a wedge ring against which the fastening devices engage.

It will be thus seen that by the use of my construction of rim not only is provision made to more securely anchor the tire base in the rim, by reason of the cross sectional shape of the rim, but provision has been made to insure substantial contact between the rim and the felly band throughout the entire circumference of the felly band, thus distributing the load over a greater area on the felly band and increasing the adhesion between the rim and the felly band against stresses tending to loosen the rim on the felly band.

From the foregoing description, taken in connection with the accompanying drawing, it is believed the construction and advantages of my invention will be readily understood by those skilled in the art.

What I claim is:—

1. A rim comprising an annular ring-like body having an annular depression of less radius than the radius of said ring-like body, the edges of said ring-like body being extended to form tire holding flanges, said depressed portion having transverse grooves on the side adjacent the center of curvature to pass over felly band buttons.

2. In combination with the wheel having a felly band provided with a rim engaging flange and rim securing wedge devices opposite said flange, of a rim comprising an annular body adapted to rest on said felly band and on said wedges and having an intermediate annular depression adapted to lie in close proximity to the felly band, the side of said body portion being extended to form tire retaining edges, said felly band having buttons and said depressed portion of the rim having recesses to receive said buttons.

3. In combination with the wheel having a felly band provided with a rim engaging flange and rim securing wedge devices opposite said flange, of a rim comprising an annular body adapted to rest on said felly band flange and on said wedges and having an intermediate annular depression adapted to lie in close proximity to the felly band, the side of said body portion being extended to form tire retaining edges, and a traction lug connecting the rim with the felly band.

HENRY M. LAMBERT.